US006158700A

United States Patent [19]

Shieh

[11] Patent Number: 6,158,700

[45] Date of Patent: Dec. 12, 2000

[54] ARCH FRAME WITH DECORATIVE LIGHT STRING

[76] Inventor: Whiter Shieh, 6F, No.245, Tun Hua South Road, Sec. 1, Taipei, 106, Taiwan

[21] Appl. No.: 09/432,097

[22] Filed: Nov. 2, 1999

[51] Int. Cl.[7] ................................ F16L 3/08; A44B 1/04

[52] U.S. Cl. .............................. 248/74.2; 272/13; 24/339

[58] Field of Search ............................ 24/545, 563, 3.12, 24/339; 248/74.2, 62, 229.6, 231.81

[56] References Cited

U.S. PATENT DOCUMENTS

| | | | |
|---|---|---|---|
| 579,924 | 3/1897 | Glasser | 24/563 |
| 1,861,151 | 5/1932 | Buschman | 24/339 |
| 1,895,656 | 1/1933 | Gadke | 24/339 |
| 1,980,948 | 11/1934 | Abramson | 24/339 |
| 2,519,987 | 8/1950 | Wernette | 24/563 |
| 2,709,094 | 5/1955 | Polanski | 24/545 |
| 2,746,701 | 5/1956 | Carpenter | 24/339 |
| 3,163,391 | 12/1964 | Adams | 24/339 |
| 4,061,046 | 12/1977 | Lang | 74/217 |
| 4,448,435 | 5/1984 | Hon | 280/278 |
| 4,497,484 | 2/1985 | West | 272/113 |
| 4,833,444 | 5/1989 | Wisniewski | 340/432 |
| 5,062,315 | 11/1991 | Yoshigai | 74/502.2 |
| 5,423,501 | 6/1995 | Yu | 248/61 |
| 5,542,636 | 8/1996 | Mann | 248/229.26 |
| 5,613,656 | 3/1997 | Protz | 248/74.2 |

*Primary Examiner*—Carl D. Friedman
*Assistant Examiner*—Kevin McDermott
*Attorney, Agent, or Firm*—Dougherty & Troxell

[57] ABSTRACT

A supporting frame of light string includes a pair of arch bars spaced from each other and a plurality of cross bars extending between the arch bars to fix the arch bars together. A light string is attached to the bars by means of wire clips and lamp clips. Each wire clip includes a resilient C-shaped member through which the wires extend. The wire clip defines a side opening for forcibly fitting the wire clip over one of the bars thereby securely attaching the wires to the bar. Preferably, an axially-extending groove is defined in the wire clip for accommodating the wires. Each lamp clip includes a resilient C-shaped member defining an axially-extending opening for fitting the lamp clip over one of the bars. An axially-extending groove is defined in a side wall of the lamp clip for accommodating a first section of the wires and a circumferentially-extending slit is defined in the side wall of the wire clip through which a second section of the wires extends.

4 Claims, 5 Drawing Sheets

ARCH FRAME WITH DECORATIVE LIGHT STRING

BACKGROUND OF THE INVENTION

1. Field of the Invention

The present invention generally relates to a frame for supporting decorative light strings, and in particular to an arch-shaped supporting frame to which a decorative Light string is attached thereto.

2. Description of the Prior Art

Decorative light strings are widely used in holidays and festivals. A light string usually comprises electrical wires on which a plurality of lamp sockets are mounted for receiving lamps. The light string may be attached to any desired article or object, such as a tree, or a window. The arrangement of the light string on an article may be in any arbitrary pattern by fixing the wires and the bulb stands to the article and to themselves.

Since the electrical wires are usually not rigid enough to support themselves in the space, a frame is commonly adapted to support and arrange the light strings into desired shapes.

The present invention provides an arch-shaped frame for supporting a light strings, as well as clips for attaching the light string to the arch frame.

SUMMARY OF THE INVENTION

Accordingly, a primary object of the present invention is to provide an arch-shaped frame for supporting a light string.

Another object of the present invention is to provide clips for attaching a light string to an arch-shaped frame.

To achieve the above objects, in accordance with the present invention, there is provided an arch-shaped supporting frame comprising a pair of arch bars spaced from each other and a plurality of cross bars extending between the arch bars to fix the arch bars together. A light string having electrical wires to which lamps are mechanically and electrically connected is attached to the bars by means of wire clips and lamp clips. Each wire clip comprises a resilient C-shaped member through which the wires extend. The wire clip defines a side opening for forcibly fitting the wire clip over one of the bars thereby securely attaching the wires to the bar. Preferably, an axially-extending groove is defined in the wire clip for accommodating the wires. Each lamp clip comprises a resilient C-shaped member defining an axially-extending opening for fitting the lamp clip over one of the bars. An axially-extending groove is defined in a side wall of the lamp clip for accommodating a first section of the wires and a circumferentially-extending slit is defined in the side wall of the wire clip through which a second section of the wires extends. A lamp is connected to the second section thereby being attached to the bar by the lamp clip. The slit may have a width sufficient to partially accommodate the lamp thereby firmly retaining the lamp on the bar.

The present invention will be apparent to those skilled in the art by reading the following description of preferred embodiments thereof, with reference to the accompanying drawings, in which:

DETAILED DESCRIPTION OF THE PREFERRED EMBODIMENTS

Figure 1:
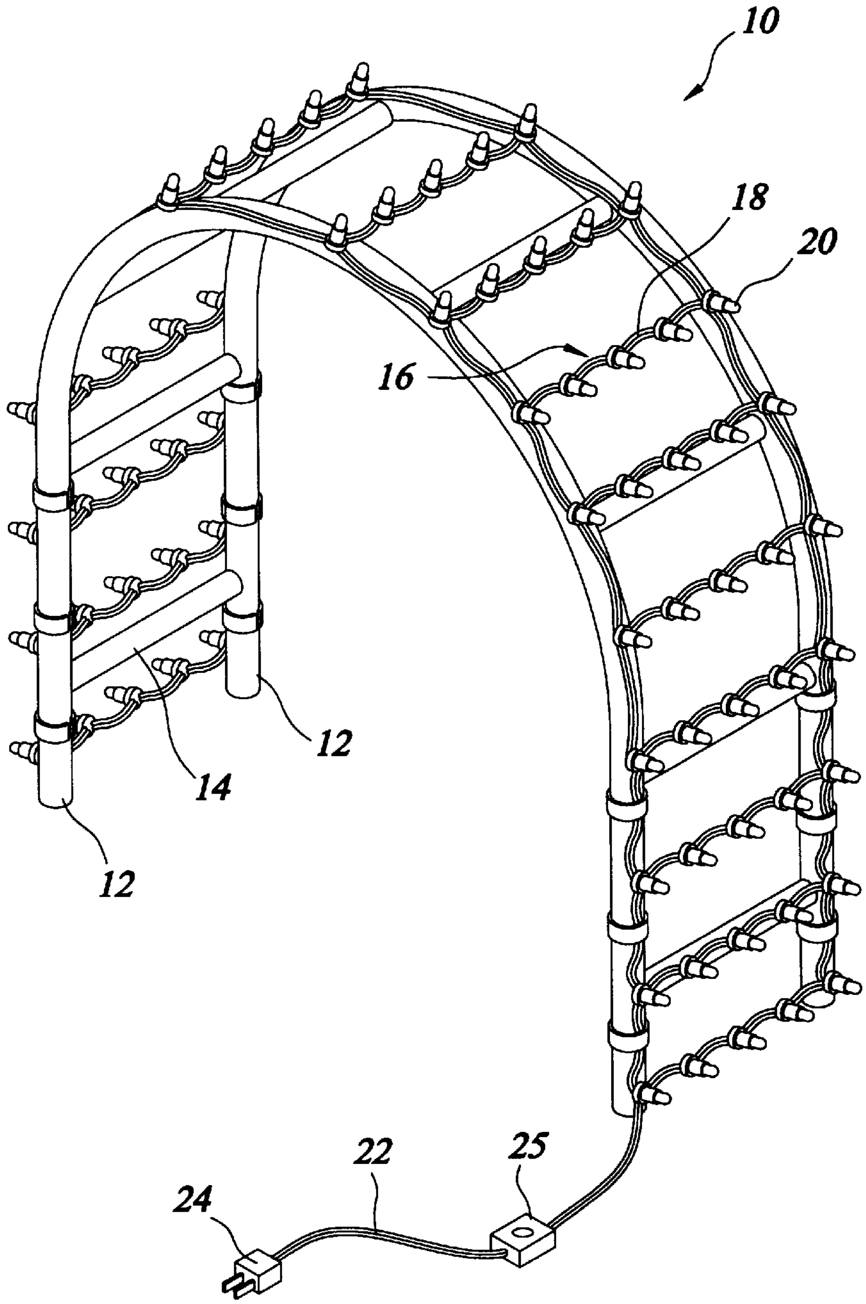
FIG. 1 is a perspective view of an arch-shaped supporting frame of the light string in accordance with the present invention with a light string attached thereto.
Figure 2:
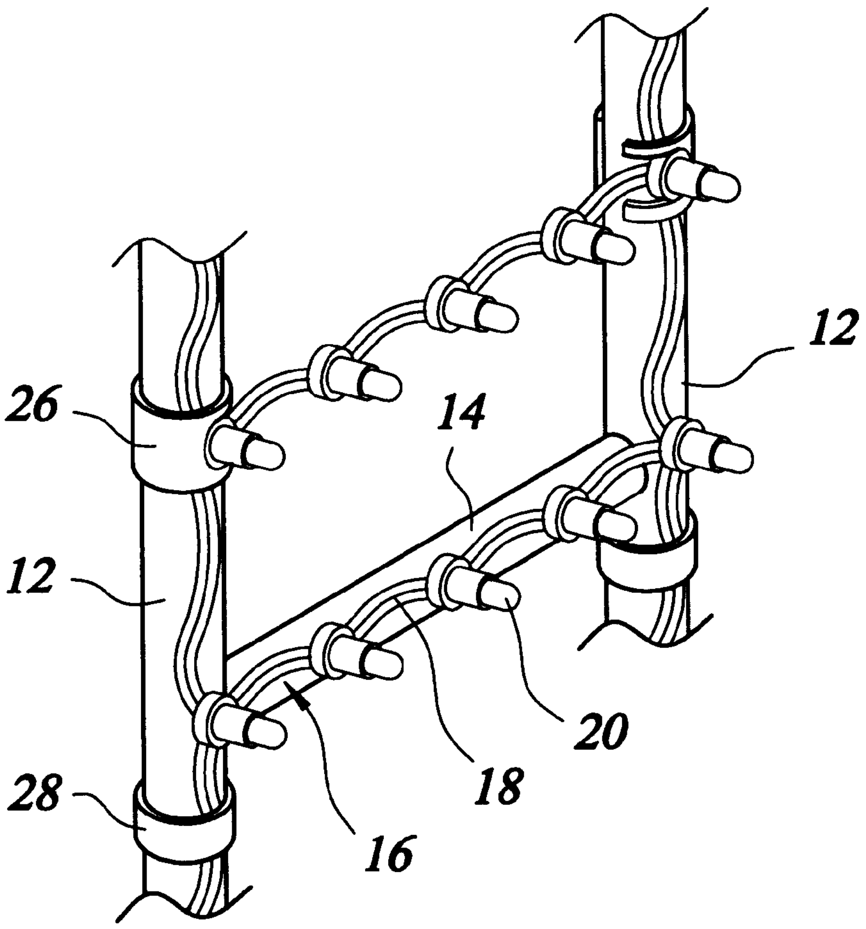
FIG. 2 is an enlarged view of a portion of the supporting frame shown in FIG. 1.

With reference to the drawings and in particularly to FIGS. 1 and 2, an arch-shaped supporting frame constructed in accordance with the present invention, generally designated with reference numeral 10, is shown, the supporting frame 10 comprises a pair of arch bars 12 having free ends supported on a fixed surface, such as the ground. A plurality of cross bars 14 are connected between the arch bars 12 for fixing the arch bars 12 together. A light string 16 extends along and is attached to the arch bars 12 and the cross bars 14. Portions of the light strings 16 may be suspended between the arch bars 12.

The light string 16 comprises electrical wires 18 to which a plurality of lamps 20 are electrically and mechanically connected. A power supply cable 22 is electrically connected to the wires 18 and forms a plug 24 for connection with an electrical power source (not shown), such as a wall outlet, to power the lamps 20. Preferably, a controller 25 is connected between the light string 16 and the plug 24 for controlling the lighting sequence and pattern of the lamps 20. The controller 25 is known to those skilled in the art and thus no further detail is needed herein.

Figure 3:
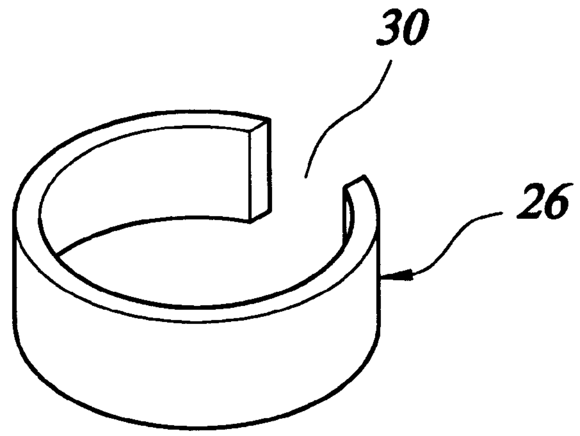
FIG. 3 is a perspective view of a wire clip in accordance with a first embodiment of the present invention.

Wire clips 26 and lamp clips 28 may be attached to the bars 12, 14 of the supporting frame 10 for securing the wires 18 and the lamps 20 to the frame 10. FIG. 3 shows a first embodiment of the wire clip 26 in accordance with the present invention. The wire clip 26 is made of a resilient material in the form of a C-shape through which the wires 18 axially extend. The C-shaped wire clip 26 defines an axially-extending side opening 30 through which an arch bar 12 or a cross bar 14 may be forcibly inserted into the C-shaped wire clip 26 to be substantially surrounded thereby. The resiliency of the C-shaped wire clip 26 tightly fixes the wire clip 26 to the bar 12, 14 thereby attaching the wires 18 to the bar 12, 14.

Figure 4:
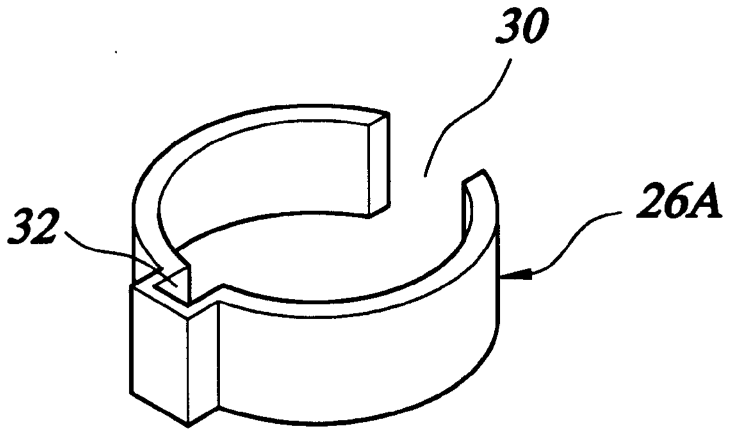
FIG. 4 is a perspective view of a wire clip in accordance with a second embodiment of the present invention.
Figure 5:
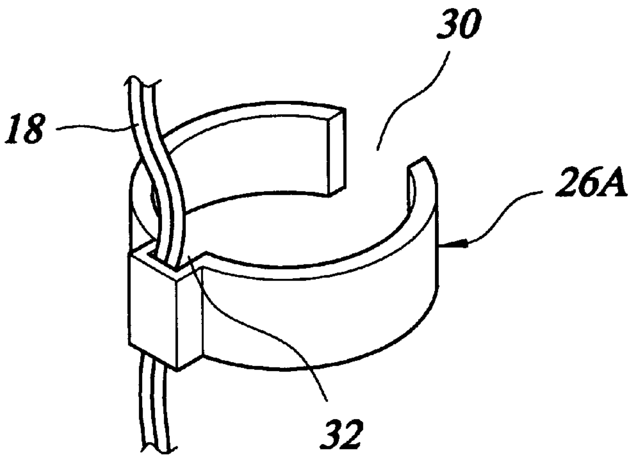
FIG. 5 is similar to FIG. 4 but showing wires received in the wire clip.

FIG. 4 shows a second embodiment of the wire clip, designated by reference numeral 26A for distinction. The wire clip 26A is made of a resilient material having a substantially C-shape defining a side opening 30 for forcibly fitting the wire clip 26A over an arch bar 12 or a cross bar 14 of the supporting frame 10. An axially-extending groove 32 may be further defined in a side wall of the C-shaped wire clip 26A for receiving the wires 18 as shown in FIG. 5. Preferably, the groove 32 is opposite to the side opening 30.

Figure 6:
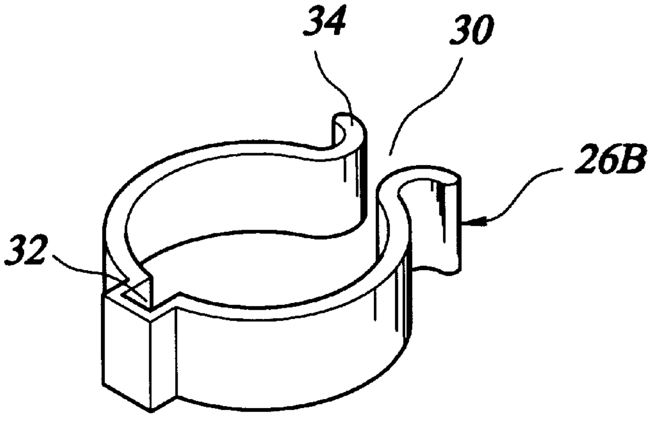
FIG. 6 is a perspective view of a wire clip in accordance with a third embodiment of the present invention.

FIG. 6 shows a third embodiment of the wire clip, designated by reference numeral 26B for distinction. The wire clip 26B is similar to wire clip 26A of the second embodiment. Namely, the wire clip 26B is made of a resilient material in the form of a C-shape defining a side opening 30 and a groove 32 in a side wall thereof. The wires 18 are received and retained in the groove 32. The side opening 30 has opposite guiding tabs 34 extending therefrom and diverging from each other for defining an expanding opening facilitating insertion of the bar 12, 14 into the wire clip 26B.

Figure 7:
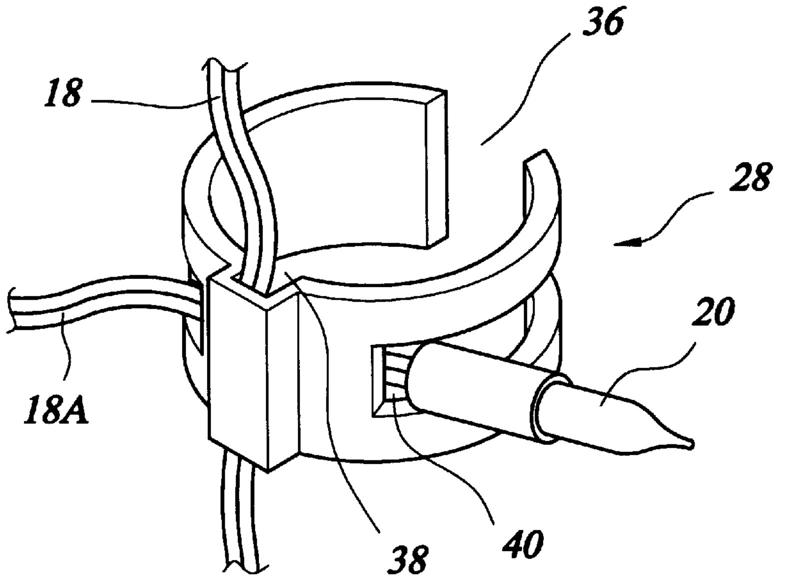
FIG. 7 is a perspective view of a lamp clip in accordance with the present invention with a lamp attached thereto.

FIG. 7 shows an embodiment of the lamp clip 28. The lamp clip 28 is made of a resilient material in the form of a C-shape having an axially-extending side opening 36 for forcibly fitting the lamp clip 28 over the arch bar 12 or the cross bar 14. The resiliency of the lamp clip 28 securely fixes the lamp clip 28 to the bar 12, 14. An axially-extending groove 38 is defined in a side wall of the lamp clip 28 for accommodating a first section of the wires 18. A circumferentially-extending slit 40 is defined in the side wall of the lamp clip 28 through which a second section of the wires 18A extend. A lamp 20 that is connected to the second section of the wires 18A and/or the first section of the wires 18 is thus attached to the lamp clip 28 whereby when the lamp clip 28 is fit over the bar 12, 14, the first and second sections of the wires 18, 18A together with the lamp 20 are attached to the bar 12, 14.

In the embodiment illustrated in FIG. 7, the circumferentially-extending slit 40 has a width only capable to receive the wires 18, 18A therein and not sufficient to accommodate the lamp 20 therein. Thus, the lamp 20 that is attached to the bar 12, 14 by the wire clip 28 is suspended to or hung on the bar 12, 14.

Figure 8:
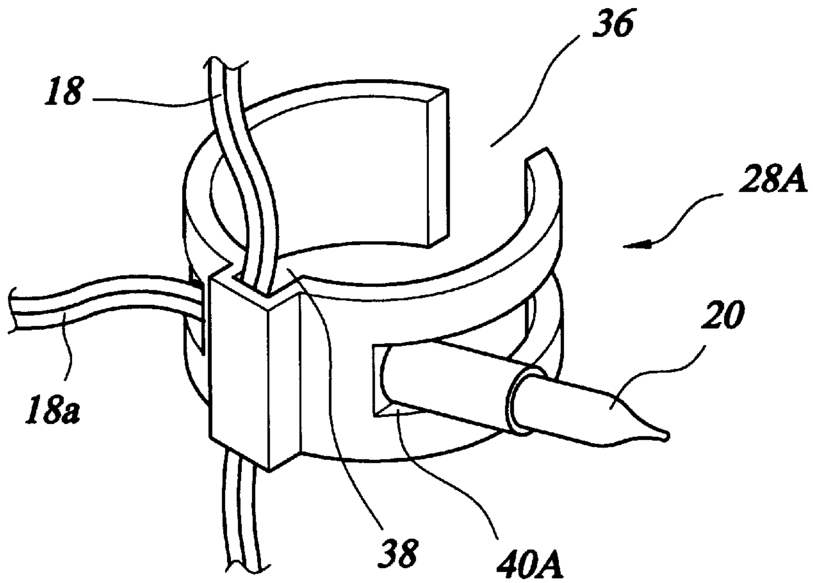
FIG. 8 is a perspective view of a lamp clip in accordance with another embodiment of the present invention.

It is apparent to enlarge the circumferentially-extending slit 40A for partially accommodating the lamp 20 therein for more stably retaining the lamp 20 on the bar 12, 14. This is shown in another embodiment of the lamp clip, designated by reference numeral 28A in FIG. 8. Since besides the width of the slit 40, the lamp clip 28A is identical to the lamp clip 28, the description of lamp clip 28 is also applicable to the lamp clip 28A.

Although the present invention has been described with reference to the preferred embodiments, it is apparent to those skilled in the art that a variety of modifications and changes may be made without departing from the scope of the present invention which is intended to be defined by the appended claims.

What is claimed is:

1. A decorative light assembly comprising:

a) a supporting frame having a pair of spaced apart arch bars with a plurality of cross bars connected between the pair of arch bars;

b) a light string having electrical wires, a plurality of lamps electrically and mechanically connected to the electrical wires, and a plug electrically connected to the electrical wires for connection with a power source;

c) a plurality of resilient first clips for clipping the electrical wires to at least the arch bars, the first clips having a first side wall with a C-shaped configuration with an axially extending first side opening through which the arch bar is forcibly inserted, and an axially extending first groove, formed in the first side wall and located opposite to the first side opening, the axially extending first groove configured to accommodate the electrical wires therein; and, d) a plurality of resilient second clips for clipping the lamps to at least the arch bars, the second clips having a second side wall with a C-shaped configuration with an axially extending second side opening through which the arch bar is forcibly inserted, an axially extending second groove formed in the second side wall and located opposite to the second side opening and configured to accommodate the electrical wires therein, and a circumferentially extending slit in the second side wall, whereby the electrical wires adjacent to one of the lamps extends through the slit thereby enabling the second clips to clip the lamp to the supporting frame.

2. The decorative light assembly of claim 1 further comprising guiding tabs extending from opposite sides of the first side opening such that the guiding tabs diverge from each other.

3. The decorative light assembly of claim 1 wherein a width of the circumferentially extending slit is less than a cross-sectional dimension of the lamp such that the lamp will not fit through the slit.

4. The decorative light assembly of claim 1 wherein a width of the circumferentially extending slit is greater than a cross-sectional dimension of the lamp such that the lamp is accommodated in the slit.

* * * * *